Dec. 20, 1960

E. W. HAWKINSON 2,965,162

TIRE BUFFING MACHINE

Filed Aug. 26, 1959

INVENTOR.
EARLE W. HAWKINSON
BY
Merchant & Merchant
ATTORNEYS

Dec. 20, 1960  E. W. HAWKINSON  2,965,162
TIRE BUFFING MACHINE

Filed Aug. 26, 1959  4 Sheets-Sheet 2

INVENTOR.
EARLE W. HAWKINSON
BY
Merchant & Merchant
ATTORNEYS

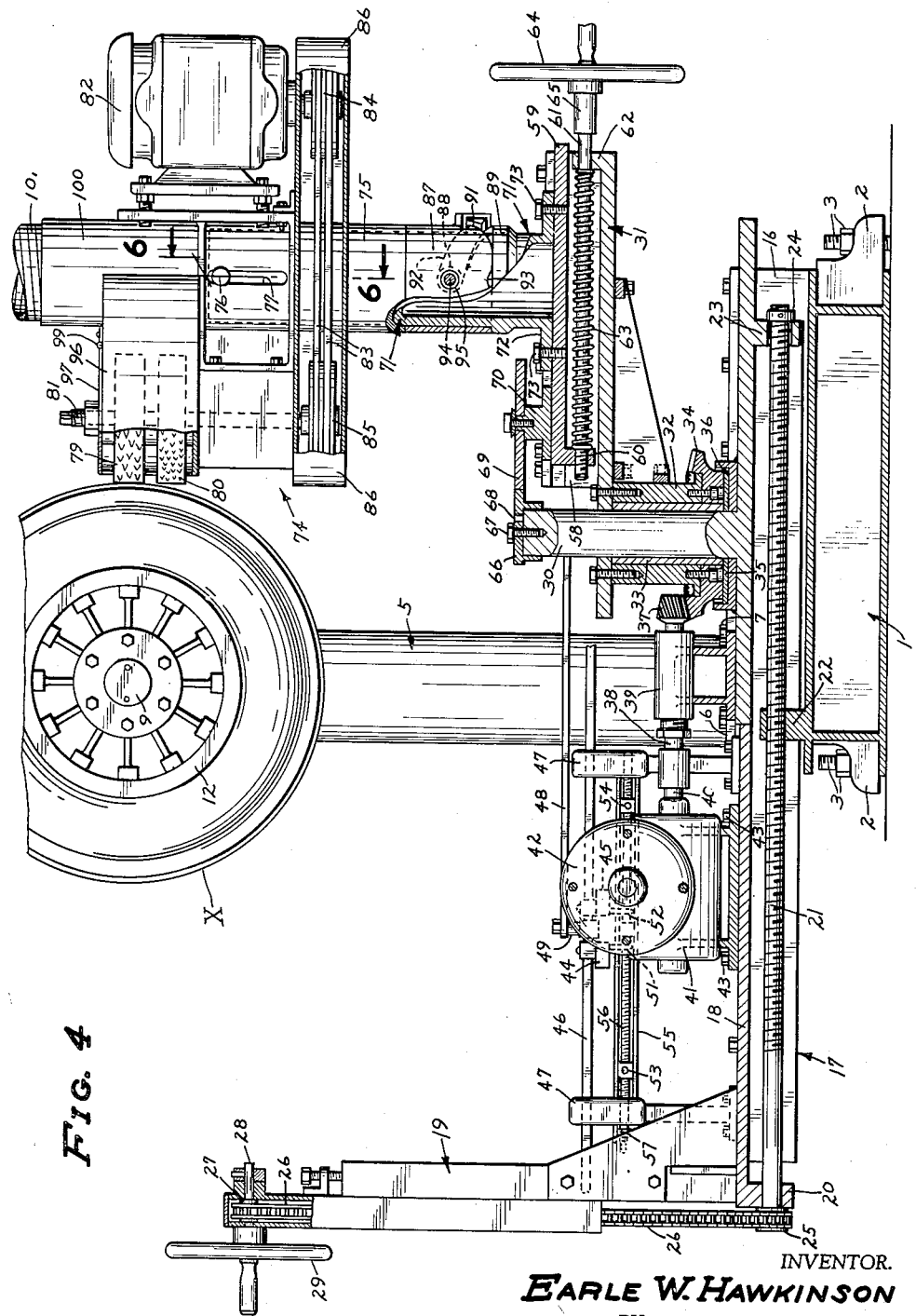

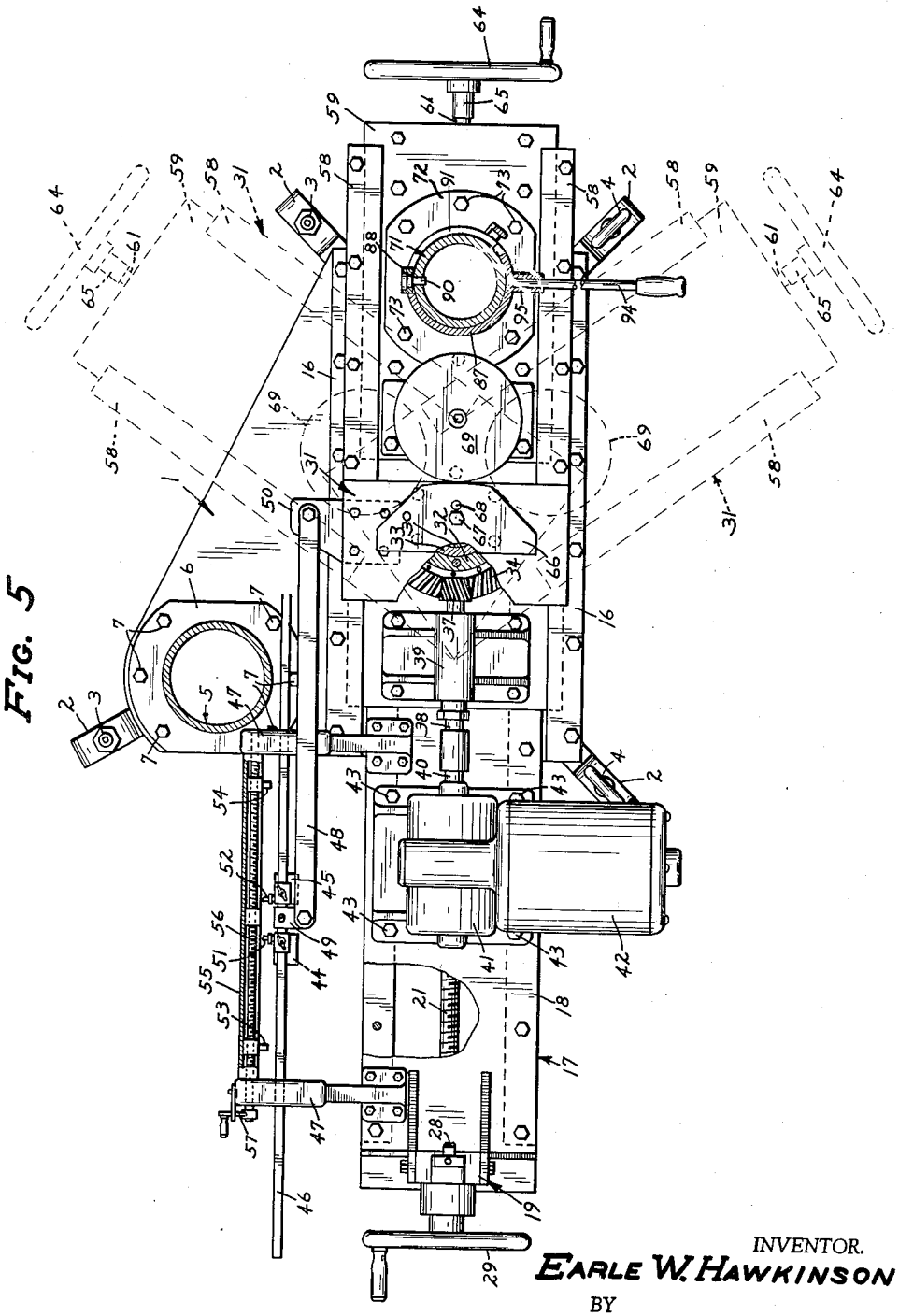

`United States Patent Office`

2,965,162
Patented Dec. 20, 1960

2,965,162

TIRE BUFFING MACHINE

Earle W. Hawkinson, Minneapolis, Minn., assignor to Paul E. Hawkinson Company, Minneapolis, Minn., a corporation of Minnesota Filed Aug. 26, 1959, Ser. No. 836,305

3 Claims. (Cl. 157—13)

My invention relates generally to tire buffing machines, and more particularly to improvements in buffing machines for preparing the road-engaging crown surfaces and adjacent shoulder portions of tires for recapping or retreading.

An important object of my invention is the provision of a tire buffing machine having means for mounting and rotating a tire on a horizontal axis, a tire engageable buffing wheel rotatable on a vetrical axis whereby to buff or abrade the tire in a direction axially thereof, and of novel means for imparting bodily movements to the buffing wheel relative to the tire whereby the buffing wheel travels in a predetermined path to impart a predetermined cross sectional shape to the crown portion of the tire.

Another object of my invention is the provision of a tire buffing machine having means for mounting and rotating a tire on a horizontal axis, a pair of axially spaced buffing wheels rotatable on a vertical axis, and novel means for moving each of said buffing wheels selectively into proper position for engagement with the crown surface portion of the tire.

Another object of my invention is the provision of a buffing machine as set forth, having a novel arrangement whereby material buffed from a tire is directed away from the machine.

Still another object of my invention is the provision of a tire buffing machine having means for supporting and rotating a tire on a horizontal axis, rotary buffing means engaging the crown surface portion of the tire, a carriage operatively supporting the buffing means, and novel means for automatically moving the carriage alternately in opposite directions of rotary movement to move the buffing means in a curved path across the crown surface portions of the tire during rotation of the tire.

The above, and still further highly important objects and advantages of my invention will become apparent from the following detailed specification, appended claims and attached drawings.

Referring to the drawings, which illustrate the invention, and in which like reference characters indicate like parts throughout the several views:

Fig. 4 is an enlarged view, partly in side elevation and partly in section, taken substantially on the line 4—4 of Fig. 1;

Fig. 5 is a view partly in plan and partly in horizontal section, taken on the irregular line 5—5 of Fig. 1.

Figure 1:
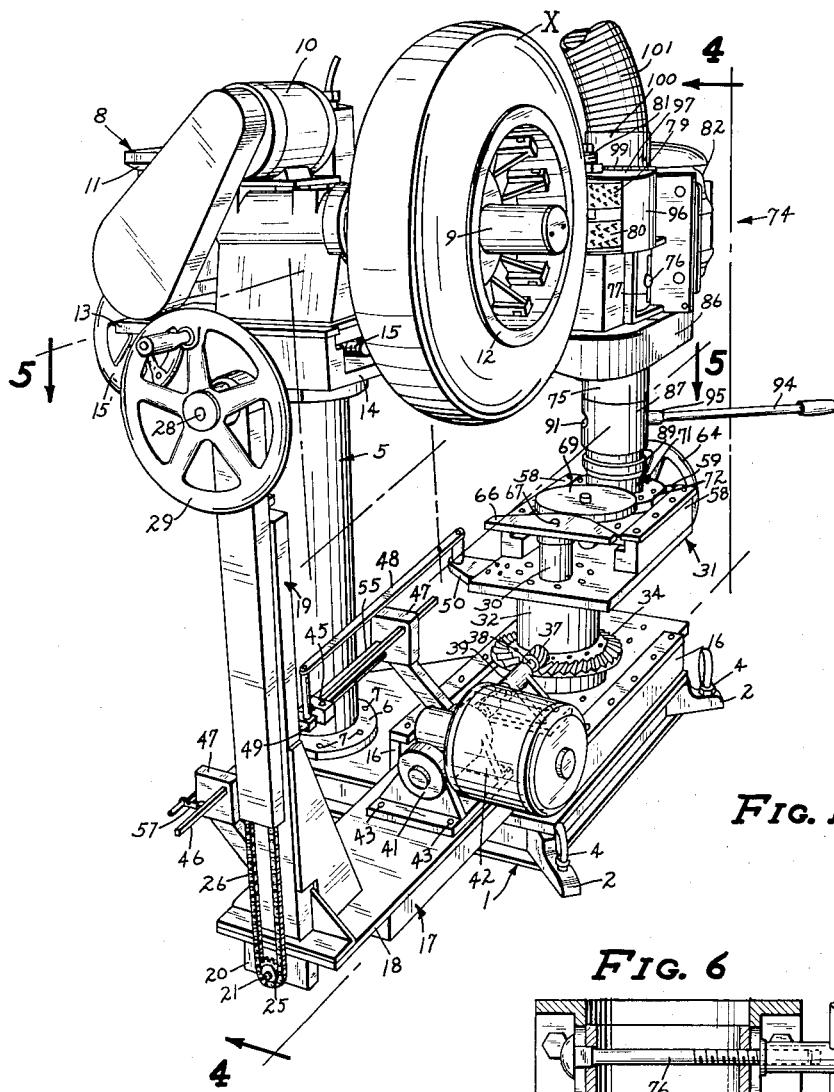
Fig. 1 is a view in perspective of a tire buffing machine built in accordance with my invention, as seen from one side and one end thereof.
Figure 6:
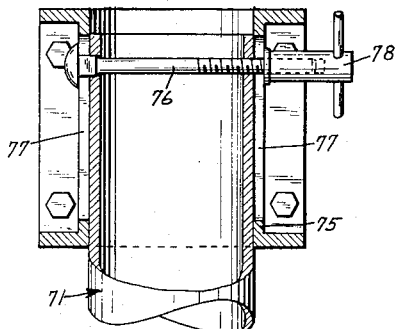
Fig. 6 is an enlarged fragmentary detail in vertical section, taken substantially on the line 6—6 of Fig. 4.
Figure 2:
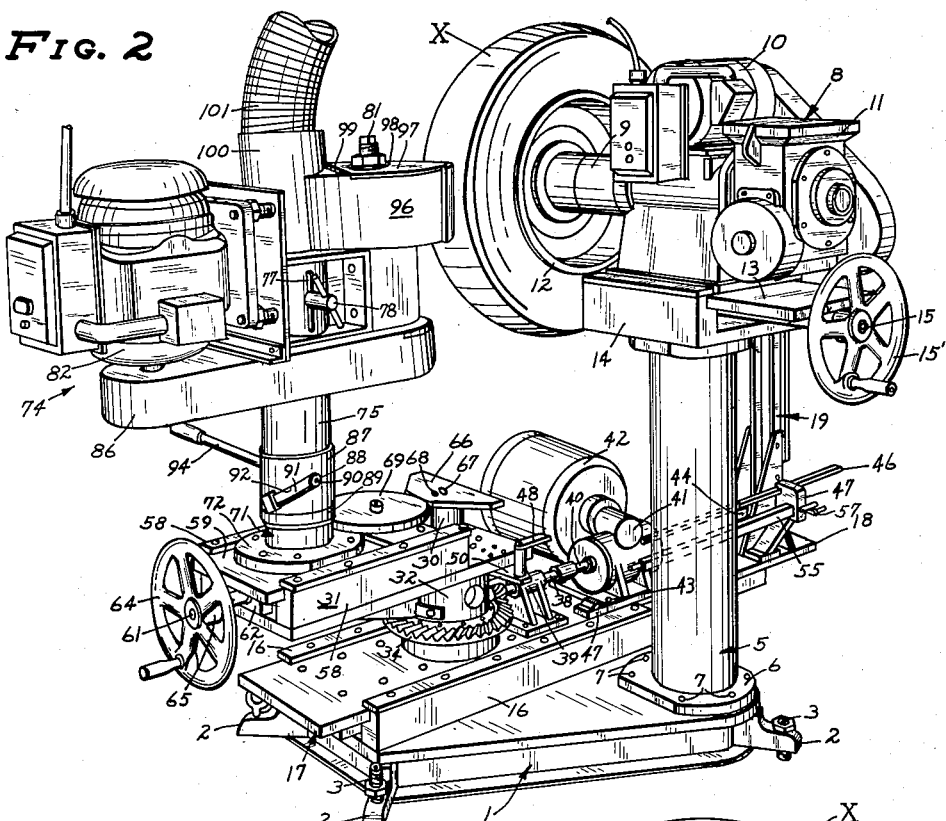
Fig. 2 is a view in perspective of the machine of Fig. 1, as seen from the opposite side and end thereof.

Referring with greater detail to the drawings, a horizontally disposed base is indicated by the numeral 1, the same being shown as being provided with a plurality of outwardly projecting feet 2 having leveling screws or the like 3 and 4. A rigid upright tubular pedestal 5 extends upwardly from the base 1 adjacent one side thereof, and is provided at its lower end with a mounting flange 6 that is rigidly secured to the base 1 by means of anchoring screws or the like 7. At its upper end, the pedestal 5 carries mechanism, indicated generally at 8, for rotatively mounting a shaft 9 on a horizontal axis, the mechanism 8 including an electric motor 10 and power transmission gearing not shown, but contained within a gear housing 11 for imparting rotary movement to the shaft 9. The shaft 9 is adapted to have mounted thereon a wheel 12 which carries a tire X to be buffed. The mechanism 8, together with the shaft 9, wheel 12, and tire X, is adjustable transversely of the pedestal 5, the mechanism 8 being mounted on a slide member 13 mounted in guideways 14 at the upper end of the pedestal 5, adjustment being had through the medium of an adjustment screw 15 to one end of which is secured a handwheel 15'. The details of construction of the tire supporting means, above described, do not in themselves comprise the instant invention. Hence, for the sake of brevity, further detailed showing and description thereof is omitted, reference being had to my prior United States Letters Patent No. 2,787,089 for detailed disclosure thereof.

A pair of laterally spaced parallel horizontally disposed guide rails 16 are rigidly secured to the base 1, the guideways 16 mounting and guiding an elongated first slide 17 for linear sliding movements in opposite directions normal to the direction of the axis of the wheel supporting shaft 9, and in a horizontal plane well below the level of the tire X mounted on the shaft 9. The slide 17 is formed to provide a longitudinally projected extension portion 18, to the outer end of which is secured an upstanding leg 19. Said outer end of the extension portion 18 is further formed to provide a bearing 20 for one end portion of a screw threaded shaft 21 which extends longitudinally between the guide rails 16, and which has screw threaded engagement with a nut element 22 fast on the base 1, see Fig. 4. The opposite end portion of the shaft 21 is journalled in a bearing boss 23 depending from the first slide 17, and a stop collar 24 is mounted on the adjacent end of the shaft 21 to limit movement of the screw 21 in one direction longitudinally of the slide 17. A sprocket wheel 25 is rigidly secured to the end of the screw threaded shaft 21 outwardly of the bearing 20 and has entrained thereover an endless link chain 26 that is also entrained over a second sprocket 27 fast on a shaft 28 journalled in the upper end portion of the leg 19. A handwheel 29 is secured to the shaft 28 whereby the screw threaded shaft 21 may be rotated to properly position the slide 17 relative to the base 1. The sprocket 25 cooperates with the stop collar 24 to limit longitudinal movement of the shaft 21 relative to the first slide 17.

A vertically disposed shaft 30 extends upwardly from the first slide 17 and journals for rotation on a vertical axis, a generally horizontally disposed carriage 31. The carriage 31 includes a downwardly extending tubular member 32 that is journalled on the shaft 30 by means of a sleeve bearing 33, see Fig. 4. A bevel gear 34 is bolted or otherwise rigidly secured to the lower end of the tubular member 32, and rests upon an annular thrust bearing 35 that is mounted in a seat 36 on the first slide 17. A bevel pinion 37, in meshing engagement with the bevel gear 34, is mounted on one end of a shaft 38 that is journalled in a bearing 39 bolted or otherwise rigidly secured to the slide 17. The shaft 38 is coupled to the output shaft 40 of a conventional gear reducer 41 that is driven by an electric motor 42. The gear reducer 41 is bolted or otherwise rigidly secured to the extension 18 of the slide 17, as indicated at 43.

The motor 42 is of the reversible type, and is controlled by a pair of conventional reversing switches 44 and 45 that are adjustably mounted on an elongated rod or bar 46 that is mounted for longitudinal sliding movements in a pair of spaced brackets 47 bolted or otherwise rigidly secured to the extension portion 18 of the slide 17. A control arm 48 is disposed in spaced parallel relation to the switch mounting bar 46 and is pivotally secured at one end to a connector block 49 rigidly secured to the bar 46, and at its other end to a plate-like member 50 that is bolted or otherwise rigidly secured to the carriage 31 in radially outwardly spaced relationship to the axis of the carriage mounting shaft 30. The switches 44 and 45 are provided with conventional switch actuator cranks 51 and 52 respectively that are adapted to engage respective abutment elements 53 and 54 that are mounted for sliding movements in a channel-shaped guide member 55 secured at its opposite ends to the brackets 47. An adjustment screw 56 is contained within the guide member 55 and is journalled at its opposite ends in the brackets 47. The adjustment screw 56 is provided with a right hand thread for approximately one-half its length and with a left hand thread for approximately the other half of its length, each of the threads having through threaded engagement with one of the abutment elements 53 or 54. Rotation is imparted to the adjustment screw 56 by a handle-equipped crank 57 at one end thereof, whereby the abutment elements 53 and 54 may be shifted toward and away from each other as desired.

From the above, it should be obvious that, with the motor 42 driving the shaft 38 in one direction, rotary movement will be applied to the carriage in a given direction until one of the control switches 44 or 45 is moved into engagement with its respective abutment element 53 or 54. Upon tripping of the engaged switch 44 or 45 by its respective abutment element, the direction of rotation of the shaft 38 will be reversed and the carriage 31 will be caused to rotate in the opposite direction until the other reversing switch is moved into operative engagement with its respective abutment element whereupon rotation of the carriage is again reversed. By having the control switches 44 and 45 adjustably mounted on the mounting bar 46, and by having the distance between the abutment 53 and 54 adjustable, it will be readily seen that rotation or oscillatory movement of the carriage 31 can be accurately controlled.

The carriage 31 is provided with a pair of laterally spaced parallel horizontally disposed guide rails 58 which mount a second slide 59 for horizontal linear movements toward and away from the axis of the shaft 30. The inner end of the second slide 59 is provided with a depending nut element 60 in which is screw threaded the threaded end of an adjustment screw 61, the opposite end portion of which is journalled in an upstanding bearing lug or the like 62. A coil compression spring 63 encompasses the shaft 61, and is compressed between the nut acting element 60 and bearing lug 62 to yieldingly urge the second slide 59 in one direction of its movement, namely toward the axis of the carriage supporting shaft 30. Outwardly of the bearing lug 62, the adjustment screw or shaft 61 is provided with a hand wheel 64 having an elongated mounting boss 65 the end of which is adapted to engage the bearing lug 62 to limit inward movement of the second slide 59.

For automatically controlling linear sliding movements of the second slide 59 with respect to the carriage 31, I provide a template 66 which is rigidly but retachably secured to the upper end of the shaft 30, by means of a machine screw or the like 67, and held against rotation on the shaft 30 by means of a locating pin 68 which extends upwardly from the shaft 30 through a suitable aperture in the template 66 radially outwardly of the locking screw 67. Cooperating with the template 66 is a follower element in the nature of a disc-like roller 69 that is journalled on a flanged mounting block 70 bolted or otherwise rigidly secured to the second slide 59. With reference to Fig. 4, it will be seen that the follower element 69 is yieldably urged into engagement with the template 66 by action of the coil compression spring 63 against the second slide 59. The specific purpose of the template 66 will hereinafter become apparent.

Extending upwardly from the second slide 59 is a support means in the nature of a tubular standard 71 having a circumferentially extended radial flange 72 that is bolted to the second slide 59, as indicated at 73. A buffing head, indicated in its entirety by the numeral 74 includes a tubular member 75 which slidably encompasses the tubular standard 71, and which is held against rotary movement thereon by a carriage bolt 76 extending diametrically through the upper end portion of the standard 71 and through aligned vertically extending slots 77 in the tubular member or portion 75 of the buffing head 74. A clamping nut 78 is screw threaded on to the carriage bolt 76 to releasably lock the buffing head 74 against vertical movement on the standard 71. The buffing head 74 includes a pair of axially aligned rotary rasps or buffing wheels 79 and 80 that are mounted on a vertical shaft 81 journalled in the buffing head 74 in laterally spaced relation to the standard 71. The shaft 81 and buffing wheels carried thereby is driven by a suitable electric motor 82 through the medium of drive belts 83 entrained over a multiple groove drive pulley 84 secured to the shaft of the motor 82 and a second multiple groove pulley 85 rigidly secured to the lower end of the buffing wheel shaft 81, see Fig. 4. As a safety measure, the belts 83 and pulleys 84 and 85 are covered by a shroud or casing 86.

Figure 3:
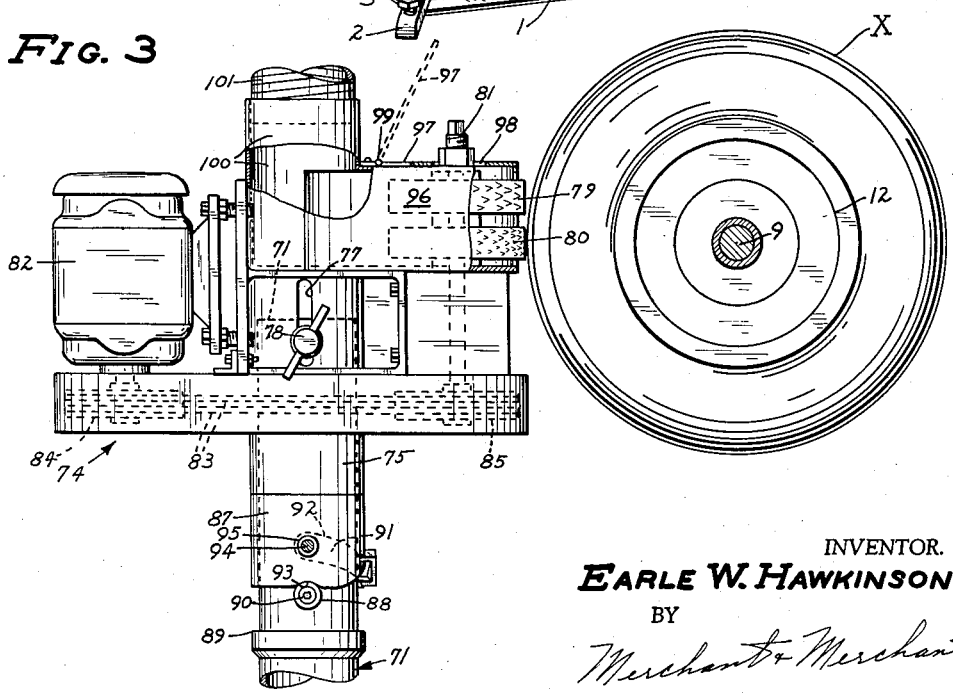
Fig. 3 is a fragmentary view in side elevation of a portion of Fig. 2, some parts being broken away and some parts being shown in section.

The buffing wheels 79 and 80 are so arranged that raising or lowering of the buffing head 74 on the standard 71 will position one or the other of said buffing wheels in a horizontal plane level with the axis of the wheel supporting shaft 9, one of the buffing wheels preferably having teeth that are coarser than those of the other wheel, whereby a choice may be had in the finish on the crown surface of the tire to be buffed. For the purpose of selectively positioning the buffing wheels 79 and 80 in said horizontal plane level with the axis of the tire supporting shaft 9, I provide a tubular cam member 87 and a cooperating cam follower 88. The tubular cam member 87 slidably encompasses the standard 71 and is interposed between the lower end of the tubular member 75 and a shoulder 89 formed on the standard 71 near the lower end thereof. The cam follower 88 is in the nature of a roller, and is journalled on a stub shaft 90 which projects radially outwardly from the standard 71, the roller 88 being adapted to be received in a helically extended slot 91 in the tubular cam member 87, one side of the slot 91 forming a cam surface 92 which rides on the cam follower roller 88. Thus, when rotary movement is imparted to the tubular cam member 87 in either direction, the same will be lowered or raised on the standard 71, carrying with it the buffing head 74, which rests upon the upper end of the tubular cam member 87. The cam slot 91 has an open lower end, whereby the cam surface 92 thereof intersects the lower end of the cam member 87, said lower end defining a downwardly opening notch or recess 93 in circumferentially spaced relation to the intersection of the cam surface 92 with the bottom end of the cam member 87, see Figs. 3 and 4. When the cam member 87 is rotated in a direction to cause raising of the buffing head 74, to the extent that the lower buffing wheel 80 is level with the axis of the tire supporting shaft 9, the cam follower roller 88 is in engagement with the lower end of the cam member 87 and outwardly of the cam slot 91. Further rotation of the cam member 87 in the same direction causes the cam follower roller 88 to be received in the recess 93, as shown in Fig. 3, whereby the cam member 87 is releasably held against accidental rotation due to vibration or the like. When it is desired to lower the buffing head 74, to bring the upper buffing wheel 79 to the level of the axis of the shaft 9, the cam member 87 is rotated in the opposite direction to cause the follower roller 88 to be received into the cam slot 91, the cam member 87 and buffing head 74 being lowered under the action of gravity, until the lower end of the cam member 87 rests upon the shoulder 89. Means for imparting rotary movement to the cam member 87 to raise and lower the head 74, comprises a handle equipped bar 94 the inner end of which is insertable into a socket 95 which projects radially outwardly from the cam member 87. Once the buffing head is set at the desired elevation, the bar 94 may be withdrawn from the socket 95 and stored on the base 1 or in any suitable place until such time as it is desired to change the elevation of the buffing head 74. The carriage bolt 76 and clamping nut 78 further aid in locking the buffing head 74 at the desired elevation.

When it is desired to buff the crown surface portion of a tire to be recapped or retreaded, the tire is mounted on the wheel 12 and the wheel in turn mounted on the shaft 9. A template 66 having the desired outline or contour is then mounted on the upper end of the shaft 30, the hand wheel 64 rotated in a direction to move the slide 59 toward the shaft 30 until the follower roller 69 engages the template 66 under yielding bias of the spring 63. The hand wheel 29 is then rotated in a direction to move the first slide 17 and all parts carried thereby toward engagement of the selected buffing wheel 79 or 80 with the road engaging crown surface of the tire X. With the reversing switches 44 and 45 together with their respective abutment elements 53 and 54 properly positioned, the motors 10, 42 and 82 are energized to respectively impart rotary movement to the tire X, oscillatory movement to the carriage 31 and all parts carried thereby, and rotary movement to the buffing wheels. With the follower roller 69 in engagement with the template 66, oscillatory movement of the carriage 31 will cause the buffing wheels to move bodily in a path defined by the outline of the template 66, and buff the tire to the desired profile.

A dust collector hood 96 partially encompasses the buffing wheels 79 and 80, to serve as a guard for the buffing wheels and as part of a conveyor for removal of dust in the form of minute rubber particles abraded from the tire. The hood 96 includes a top portion 97 having an enlarged opening 98 therein through which the upper end of the buffing wheel shaft 81 extends. At its rear end, the top 97 is hinged to the hood 96, as indicated at 99, whereby the top 97 may be raised, as indicated by dotted lines in Fig. 3, so that the buffing wheels 79 and 80 may be removed from the shaft 81 when replacement thereof becomes necessary. The rear end portion of the hood 96 defines an upwardly extending tube or passage 100 that is axially aligned with the standard 71 and which is adapted to receive one end of a flexible conduit 101 which may be assumed to be connected to a suitable suction fan-equipped dust collector, not shown.

From the above it will be seen that I have provided a buffing machine that is adapted to accommodate tires of various diameters and across sectional sizes merely by adjustment of the hand wheel 29 to move the first slide 17, and by use of suitable templates of the type indicated at 66, and which will satisfactorily cross buff the tire to the desired contour. While I have shown a commercial form of my buffing machine, it will be understood that the same is capable of modification, and that modification may be made without departure from the spirit and scope of the invention as defined in the claims.

What I claim is:

1. In a tire buffing machine, a base, rotary means mounted on said base for supporting a tire for rotation on a horizontal axis, means for imparting said rotation to said tire, a first slide mounted on said base for horizontal linear movements in opposite directions transversely with respect to the axis of rotation of said tire, a carriage mounted on said first slide for common movements therewith and for rotation on a vertical axis, a second slide mounted on said carriage for horizontal linear movements, a template fixedly mounted on said first slide, a template engaging follower mounted on said second slide, said template and follower being responsive to rotation of said carriage to impart said linear movement to said second slide, support means extending upwardly from said second slide, a rotary tire buffing wheel journalled in said support means on a vertical axis and positioned for tangential engagement with the road engaging crown surface of the tire, means for imparting rotation to said buffing wheel, means for imparting limited rotary movement to said carriage alternately in opposite directions, whereby said buffing wheel moves in a path corresponding to the contour of said template, said last mentioned means comprising a motor mounted on said first slide and intermeshing gears one of which is operatively connected to said motor and the other of which is mounted fast on said carriage, and control elements for reversing the direction of driving rotation imparted by said motor to said one of the gears responsive to predetermined rotary movement of said carriage in said opposite directions.

2. In a tire buffing machine, a base, rotary means mounted on said base for supporting a tire for rotation on a horizontal axis, means for imparting said rotation to said tire, a first slide mounted on said base for horizontal linear movements in opposite directions transversely with respect to the axis of rotation of said tire, a carriage mounted on said first slide for common movements therewith and for rotation on a vertical axis, a second slide mounted on said carriage for horizontal linear movements, a template fixedly mounted on said first slide, a template engaging follower mounted on said second slide, yielding means urging said second slide in a direction to move said follower into engagement with said template, said template and follower being responsive to rotation of said carriage to impart said linear movement to said second slide against the bias of said yielding means, an adjustment screw interconnecting said carriage and second slide for moving said second slide in one direction of its linear movement against bias of said yielding means independent of said template and for limiting said linear movement of said second slide in the opposite direction, support means extending upwardly from said second slide, a rotary tire buffing wheel journalled in said support means on a vertical axis and positioned for tangential engagement with the road engaging crown surface of the tire, means for imparting rotation to said buffing wheel, means for imparting limited rotary movement to said carriage alternately in opposite directions, whereby said buffing wheel moves in a path corresponding to the contour of said template, said last-mentioned means comprising a motor mounted on said first slide and intermeshing gears one of which is operatively connected to said motor and the other of which is mounted fast on said carriage, and control elements for reversing the direction of driving rotation imparted by said motor to said one of the gears responsive to predetermined rotary movement of said carriage in said opposite directions.

3. In a tire buffing machine, a base, rotary means mounted on said base for supporting a tire for rotation on a horizontal axis, means for imparting said rotation to said tire, a first slide mounted on said base for horizontal linear movements in opposite directions transversely with respect to the axis of rotation of said tire, a carriage mounted on said first slide for common movements therewith and for rotation on a vertical axis, a second slide mounted on said carriage for horizontal linear movements, a template fixedly mounted on said first slide, a template engaging follower mounted on said second slide, said template and follower being responsive to rotation of said carriage to impart said linear movement to said second slide, an upright cylindrical standard extending upwardly from said second slide, a buffing head mounted on said standard for vertical movements with respect to said standard, said buffing head including a tubular sleeve slidably encompassing said standard, means positively holding said sleeve against rotation relative to said standard, a pair of axially spaced rotary buffing wheels journalled in said head for rotation on a vertical axis and positioned for selective engagement with the road engaging crown surface of the tire, a drive motor mounted on said head and operatively coupled to said buffing wheels, a cam element comprising a tubular member slidably encompassing said standard in underlying supporting engagement with said sleeve and defining a helically extending cam surface, a cam follower element extending outwardly from said standard in engagement with said cam surface, means for rotating said tubular member to raise and lower said head whereby to move said buffing wheels selectively into a horizontal plane level with the axis of said tire, said cam surface intersecting the lower end of said tubular member, said lower end of the tubular member defining a shallow downwardly opening recess in circumferentially spaced relation to the lower end of said cam surface for reception of said cam follower to releasably hold said tubular member against rotation on said standard, motor means mounted on said first slide for imparting rotary movement to said carriage, intermeshing gears, one of which is operatively connected to said motor means and the other of which is mounted fast on said carriage, and control elements operatively coupled to said first slide and said carriage for reversing the direction of driving rotation of said motor means responsive to predetermined rotary movement of said carriage in opposite directions.

References Cited in the file of this patent
UNITED STATES PATENTS

| | | |
|---|---|---|
| 1,182,362 | Fischer | May 9, 1916 |
| 2,243,461 | Haskins | May 27, 1941 |
| 2,864,445 | Hawkinson | Dec. 16, 1958 |